July 17, 1923.

J. E. HARVEY

THERMOSTATIC CONTROL

Filed May 23, 1921    2 Sheets-Sheet 1

1,461,878

Inventor
John E. Harvey
by James R. Hodder
Attorney

July 17, 1923. 1,461,878
J. E. HARVEY
THERMOSTATIC CONTROL
Filed May 23, 1921 2 Sheets-Sheet 2

Inventor
John E. Harvey
by James R. Hodder
Attorney

Patented July 17, 1923.

1,461,878

UNITED STATES PATENT OFFICE.

JOHN E. HARVEY, OF MILTON, MASSACHUSETTS.

THERMOSTATIC CONTROL.

Application filed May 23, 1921. Serial No. 471,550.

*To all whom it may concern:*

Be it known that I, JOHN E. HARVEY, a citizen of the United States, and resident of Milton, in the county of Norfolk and State of Massachusetts, have invented an Improvement in Thermostatic Controls, of which the following description, in connection with the accompanying drawings, is a specification, like letters on the drawings representing like parts.

In electrically heated devices, and particularly those electrically heated devices of the portable type, such for example as electric flat irons, some type of cut out is not only desirable, but essential, as it is quite usual for such irons to be left with the current on for hours, with the result that the usefulness of the iron is destroyed, and frequently fires are caused by the overheated iron.

Various attempts have been made to devise a thermostatic cut out for devices of the above character, none of which have been successful. All such cut outs will operate provided the device to which they are attached is not disturbed, but the very character of the devices to which they are attached makes it necessary that they be handled, and are therefore subject to shock. The cut outs in use at the present time are so arranged as to move gradually to the operating position as the heat of the article to which they are applied rises, with the result that such cut outs are extremely sensitive and liable to be moved into operated position should the article be subjected to even a slight jar, bump, accidental blow or the like. Such premature action is undesirable, and necessitates constant operation of the switch by the operator when the article is picked up.

An important object is a novel combination of thermostats cooperating together to control an electric cut out switch or the like. For this purpose I provide a plurality of thermostats, of which at least one is so remote from the heating element as to be unaffected thereby, and therefore to render the action of the switch or other member operated thereby, positive.

In my present invention I have endeavored to overcome the objectionable features of prior devices as above pointed out by associating with the single thermostat ordinarily employed a second thermostat, this second thermostat directly operating the cut out and being in turn controlled by the first said single thermostat. Further, I so arrange the second thermostat with respect to the first thermostat that no jarring to which the article carrying my invention may be subjected will affect the second thermostat in any way. Only the movement of the first thermostat to the extreme limit under the influence of the heat of the article will bring it into position to control the operation of the second thermostat and the consequent operation of the cut out switch by said second thermostat. The range of movement of the operating elements of the first thermostat may be as large or small as desired, and such range may be varied at will. The second thermostat is quick and positive in its action and cooperates with the first thermostat and with the cut out switch to perform its desired function.

An object of my present invention, therefore, is an improved thermostatic cut out for electrically heated or operated devices.

Other objects and novel features of the construction and arrangement of parts constituting my invention will appear as the description of the invention progresses.

In the accompanying drawings, illustrating a preferred embodiment of my invention, Fig. 1 is a side elevation;

Figure 1:
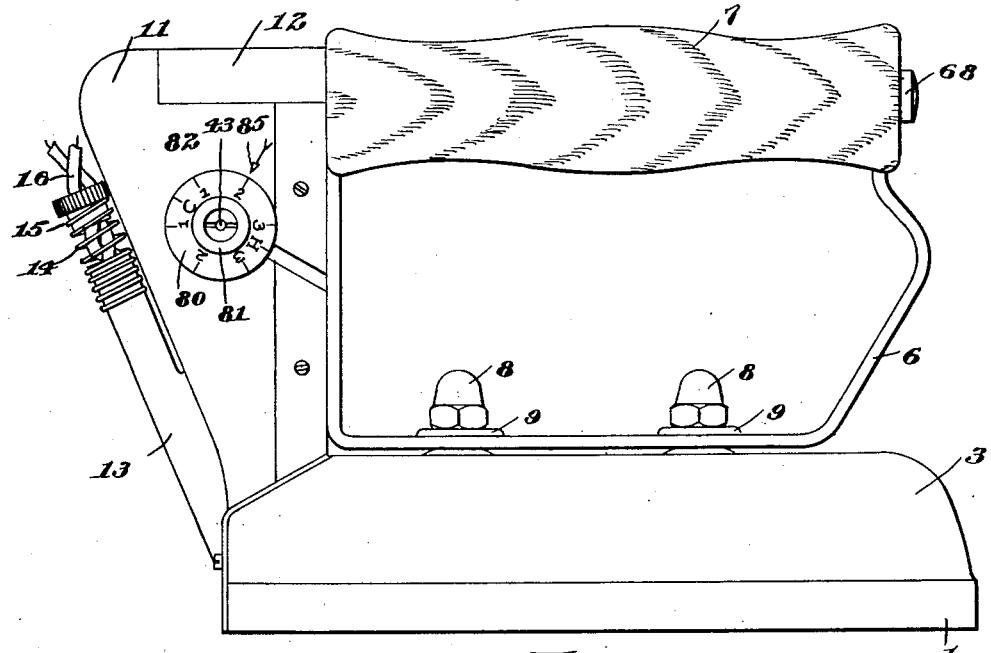
Figure 3:
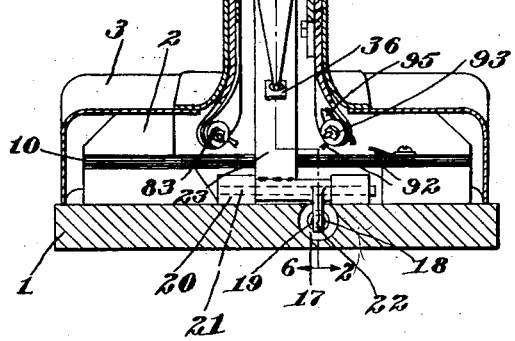
Fig. 3 is a sectional view on the line 3—3 of Fig. 2.

Referring to the drawings, 1 illustrates the base portion of a flat iron to which my invention has been applied, 2 designates a second base portion and 3 is a metallic covering for the base portions and associated parts. The base portion 2 is secured to the base 1 by threaded bolts 4 secured to the base 1 and extending through the portion 2, suitable retaining nuts being indicated at 5, 5. The metallic cover 3 is also secured to the same threaded bolts, and resting upon raised portions of the cover 3 is the metallic handle frame 6 to which a handle 7 of wood or other suitable material is applied.

The cover 3 and handle frame 6 are held in place on the threaded bolts 4 by cap nuts 8, 8, which hold the same firmly in position. Washers 9 are interposed between the bottom of said cap nuts and the frame portion 6.

Figure 2:
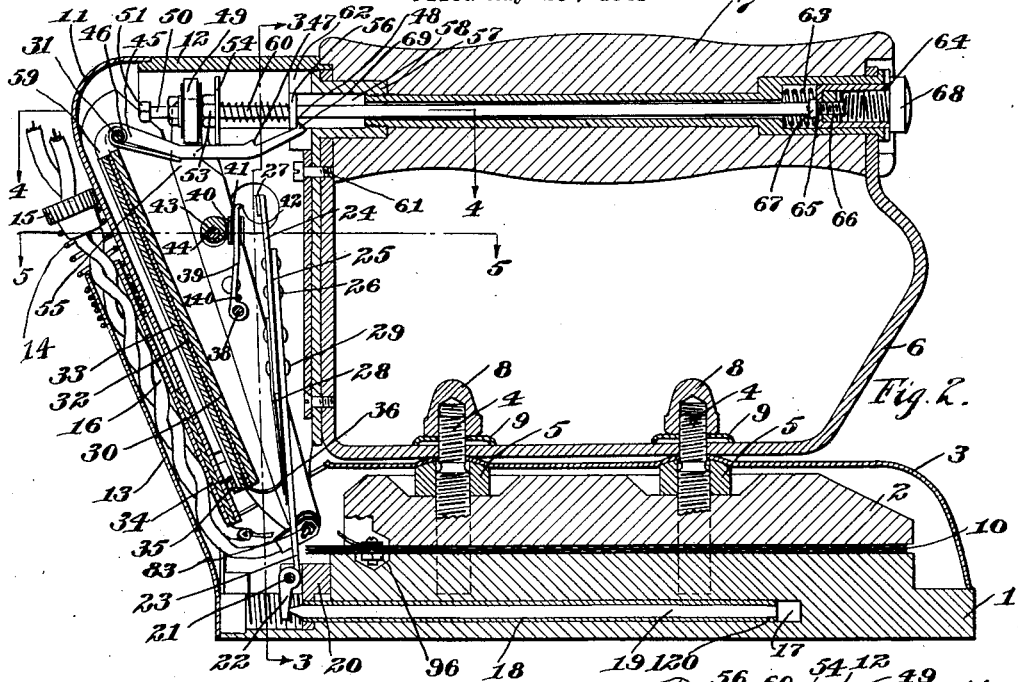
Fig. 2 is a central longitudinal section.

As shown in Fig. 2, the base portions 1 and 2 have interposed therebetween the usual heating element 10, insulated in any desired manner from said base portions. Secured to the rear portion of the iron, is an enclosing portion 11, within which are contained the switch and its cooperating parts and releasing devices. Between the handle 7 and the enclosing member 11 is an insulating and protecting portion 12, above the switch member. Attached to the rear of the enclosing portion 11 is a tubular member 13 having positioned at the top thereof a spring 14 and hollow insulating member 15 through which current conducting wires 16 pass into the interior of the enclosing portion 11. The insulating member 15 prevents the wires from coming into contact with the enclosure 11, and the spring 14 permits flexibility of the wires at the end of the tubular member 13, thus preventing breaking of the conducting wires at the outermost part of the tubular member 13.

The base portion 1 has therein a recess 17, at the rearmost portion of which is positioned a block of brass or other metal secured to the base portion by screws or in any other desired manner. Attached to the block 20 is a tubular member 18 which extends into the recess 17. This member 18 constitutes an element of my primary thermostat, the other element of which is a steel rod 19, one end of which is brazed or otherwise secured at 120 to the innermost end of the member 18, while the other end of the steel rod 19 extends outward from the block 20. The block 20 has two projecting portions through which is positioned a pivot pin 21 having rotatably mounted thereon a member 23. Projecting downwardly from the pivot pin 21 and integral with the member 23 is a prong 22 normally positioned to engage with the protruding end of the steel rod 19. This member 23 extends upwardly and has secured near its upper end a flat bronze rod 24, which is insulated from the member 23 by mica sheets or other suitable insulation 25. The rod 24, member 23, and insulation 25 are secured together by any desirable means, here shown as rivets 26. Near the upper end of the rod 24 is a platinum plate 27, while near the lower portion of the bronze rod 24 is secured a flat metallic member 28 attached to said bronze rod by rivets 29. Within the enclosure 11 and forming a framework for the operating parts of the secondary thermostatic arrangement is a heavy metallic portion 37. Secured to the right hand conducting plate 90 is a pin 38 which has pivotally mounted thereon an upwardly extending bronze member 39 normally held in rearward position by a spring 140, as clearly shown in Fig. 5. This member 39 has a platinum contact 42 adapted to engage with the platinum plate 27 of the member 24. On a rod 43 rotatably mounted in the framework 37 is an eccentric 44 adapted to engage at all times with a plate 40 secured to but insulated from the bronze member 39 by mica sheets 41, or any other desirable means. Upon actuation of the eccentric 44 by means which will be hereinafter explained, the member 39 will be forced in a direction to increase or decrease the space between the platinum contact 42 and the platinum plate 27. Extending through both sides of the framework 37 is a pin 31 to which is secured a steel plate 30 extending downwardly therefrom. Attached to this steel plate 30 is a secondary thermostat, comprised of a brass member 32 which partially envelops a copper plate 33. Between this copper plate 33 and the enclosing member 32 is a resistance unit suitably insulated therefrom by mica sheets or other desirable insulation. This secondary thermostat is secured to the steel plate 30 at its bottom-most portion by screws 35 extending through the plate 34 and to the member 30. At the bottom-most portion of the secondary thermostat is a metallic member 36 having therein an aperture through which extends the lower reduced end of the member 28. This member 36 constitutes the conducting member for electric current to the resistance element in the secondary thermostat. This member 36 fitting over the bottom portion of the plate 28 exerts tension on the member 23 tending to pull the same in the direction of the member 39, so that the portion 22 of the member 23 is kept in constant engagement with the protruding end of the steel rod 19 of the primary thermostat. Pivoted on the rod 31 is a latch member 45 held in upward position by a spring 46. The latch 45 extends over and around the rod 31 so that the end 59 of said latch comes into engagement with the uppermost end of the secondary thermostat. When current is passed through the resistance element in the secondary thermostat, the heat resulting therefrom will cause the thermostat to expand in an upward direction, forcing the upper end thereof against the end 59 of the latch 45.

The switch mechanism comprises a metallic disc 49 rotatably and slidably mounted on a rod 50 that extends through the handle portion 7, and is normally in engagement with two current conducting members 55 and 70. On the rearmost end of the rod 50 is formed a retaining head 51 that prevents the metallic disc 49 from backing off the rod. On the rod 50 is also secured a small disc portion 56 adapted to engage when the switch is in closed position with the holding notch 48 of the latch 45. Attached to the disc 49 and insulated therefrom is a metallic disc 54 of substantially the same circumference as the disc 49. Interposed between the disc 49 and the disc 54 is a nut 53. The switch is normally held spaced from the smaller disc 56 by a coiled spring 60 the purpose of which will be described later.

The frame portion 37 is secured to the handle frame 6 in any desired manner, as by screws 61. At the rearmost portion of the handle 7 is a circular metallic member 62 slotted to permit the entrance of the notched end 48 of the latch. Upon movement of the secondary thermostat in an upward direction, the end 48 of the latch will necessarily be forced downwardly against the tension of the spring 46. This will release the disc member 56 and permit it to move forward into an aperture 58 by action of an expansible spring 63 located at the end of the handle 7 opposite the switch mechanism in a recessed portion containing a cylindrical metallic member 64 which is apertured at 65 to permit the entrance of the threaded end 66 of the rod 50. The rod 50 has secured thereto a shoulder 67, bearing against the member 64 so that when the disc member 56 is released, the rod 50 actuated by the spring 63, will force the member 64 outwardly. A button 68 of non-conducting material is threaded to the outermost portion of the member 64, which member 64 is screwed to the threaded end 66 of the rod 50. When it is desired to re-position the switch 49 in operative position, the button 68 will be pressed inwardly causing the rod 50 to be pushed in a rearward direction. Thereupon the disc 54 will engage with the notch 47 of the latch 45, and will remain in engagement with the notch until the disc 56, being impelled in a rearward direction by the continued pushing on the button 68 comes in contact with a beveled portion 69 of the latch. Thereupon the latch will be pushed downwardly against the tension of the spring 46 and the switch member and disc 54 released from the notch 47 will be forced into positive contact with the current conducting members 55 and 70 by the action of the coiled spring 60.

Upon introduction of current to the heating element 10, the iron will be heated. This heat will cause the element 18 of the primary thermostat to expand in a direction away from the block 20 drawing with it the steel rod 19 whose co-efficient of expansion is less than that of the tube 18. Upon retraction of the steel rod from the position shown in Fig. 2, the member 23 will be drawn toward the platinum point 42 by the tension of the springlike member 28. Upon contact of the platinum plate 27 with the contact 42, current will pass from the electrically connected member 39 into the bronze plate 24, through the springlike member 28 and into the heating element in the secondary thermostat, whereupon the secondary thermostat will expand in an upward direction against the end 59 of the latch 45, forcing the notched end 48 of said latch downwardly, with the result above explained.

Figure 4:
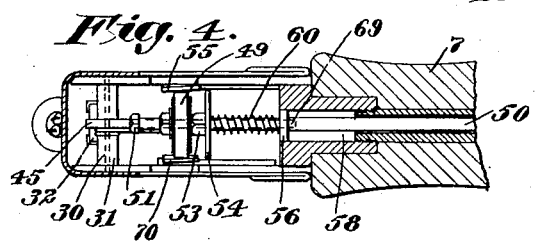
Fig. 4 is a plan sectional view on the line 4—4 of Fig. 2.

Referring now to Fig. 4, which is a plan section on the line 4—4 of Fig. 2, the disc 49 is shown in closed position. In this position the disc 49 is in contact with the two current conducting members 55 and 70, so that current is flowing from the member 55, through the disc 49, to the member 70 and from thence to the heating element.

Upon action of the secondary thermostat in an upward direction, the latch 45 will be moved on its pivot so as to force the end 69 of said latch downwardly. The latch is shown here in dotted lines under the rod 50 with the disc 56 engaging with the notch 48 of said latch. When the notched end of the latch is moved downwardly, the disc 56 and consequently the switch mechanism, will be released and the disc 56 will move forwardly into the recess 58, disconnecting the switch and shutting off the flow of current through the device.

Figure 5:
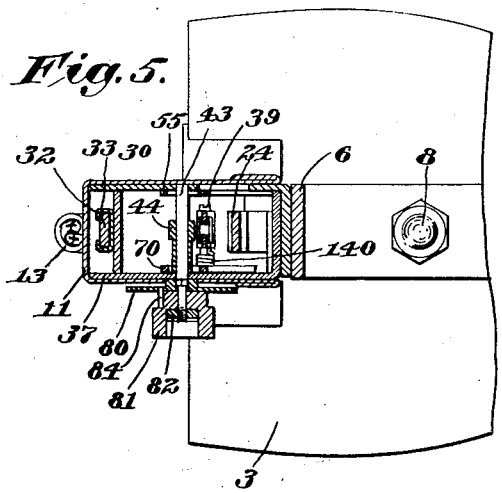
Fig. 5 is a plan section on the line 5—5 of Fig. 2.

Fig. 5 is a sectional plan view on the line 5—5 of Fig. 2, and illustrates the regulating mechanism for predetermining the degree of heat at which the secondary thermostat will operate and consequently the degree at which the circuit will be opened and current cease flowing through the device. The rod 43 is here shown extending through both sides of the framework 37 and spaced from the conducting members 55 and 70. The right hand end of this rod 43 is smaller than the main portion of the same. Over the rod 43 is fitted a disc member which will be more fully shown and described later. This disc is graduated on its exterior face to indicate the degree of heat desired. The central portion of the member 80 is squared to fit over the corresponding portion of the rod 43 to prevent rotation of the disc 80 with respect to said rod 43. A handle member 81 of hard fiber or other suitable material is then fitted over the end of the rod 43. This handle member has a recess in its outer portion which permits the insertion of a nut 82, the rod 43 being threaded at its outermost end to receive this nut. The nut being tightened, the handle 81 may be rotated and with it is rotated the disc 80, to indicate whatever degree of heat may be desired. Extending from the dial 80 is a pin 84 which fits into a recess in the side of the handle 81 so that the rotation of the disc 80 with the handle 81 will be positive.

Upon rotation of the handle 81, the eccentric 44 is also rotated, bearing against the insulated portion of the member 39 and forcing the same against the tension of its spring 140 in the direction of the member 24, to hasten or retard the time of operating the secondary thermostat. As is clearly shown in this illustration, the member 39 is electrically connected with the electric conducting member 70, so that immediately upon contact of the members 39 and 24, it will close the circuit, permitting current to flow from the member 39 through the rod 24 as above explained.

The receiving terminal of the device is shown at 83, Fig. 2, secured to the lowermost portion of the electric conducting member 55. As shown in Fig. 1, the dial 80 is graduated to indicate different degrees of heat. For instance the letter H indicates the highest degree of heat at which the secondary thermostat will be operated, because when the dial is rotated so that the letter H is indicated by the arrow 85 marked on the enclosure 11, the eccentric 44 is so positioned that the space between the platinum contact 42 and the platinum plate 27 is greatest, which means that the primary thermostat must be operated to a greater degree to permit contact between the platinum contact 42 and platinum plate 27. When the letter C is indicated by the arrow 85, a reverse condition exists, and the secondary thermostat would be actuated and the switch released before the iron or other device had attained a very great degree of heat. Varying degrees between hot and cold are indicated by the numerals on the dial. When the iron is in use, the operator decides at what point the switch is desired to be released. Thereupon the handle 81 is rotated to indicate this degree of heat. If, during the operation of the device, a higher or lower degree of heat is desired, the operator may vary the same according to the degree of heat desired.

Figure 6:
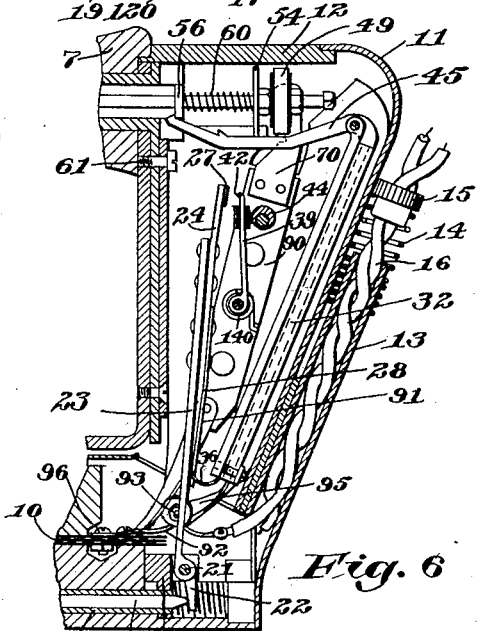
Fig. 6 is a sectional view on the line 6—6 of Fig. 3.

Referring now to Fig. 6, showing the opposite side of the iron to that illustrated in Fig. 2, the disc 49 is shown in closed position. In this position it is in contact with the conducting members 55 and 70. The member 70 is connected to an electric conducting plate 90, and to the bottom of said plate 90 is electrically connected a conducting strip 91, passing to the receiving end of the resistance wires in the heating element 10. It will be appreciated that the conducting members 70, 90 and 91 could be formed in one integral conducting portion if desired.

Upon introduction of current to the device through the terminal 83, the current passes up the member 55, across the disc 49, down the member 70 and plate 90, through the conducting strip 91 and into the heating element. Current is led from the heating element through the wire or other member 92 secured at 96, which is connected to the terminal 93 and thence back through the return wire of the pair of conductors 16.

When the action of the heating unit has begun to actuate the primary thermostat, the steel rod 19 is gradually withdrawn from position, permitting the movement of the rod 23 and associated parts in the direction of the member 39. When the heating unit has reached the degree of heat at which it is desired to open the switch, the rod 23 will have moved forward until the platinum plate 27 and contact 42 come in contact with each other. Thereupon current passes through the plate 90, through the member 39 to the member or rod 24, into and through the steel springlike member 28 to the receiving element 36 leading to the secondary thermostat. Current passes from the member 36 through the resistance element in the secondary thermostat, and from thence through the conducting strip 95 to the terminal 93. As explained heretofore, upon actuation of the secondary thermostat 32, the notched end of the latch 45 is moved downwardly and the disc 56 released, thereby releasing the switch from its electrical connections, shutting off the current, and allowing the iron to cool.

Figure 7:
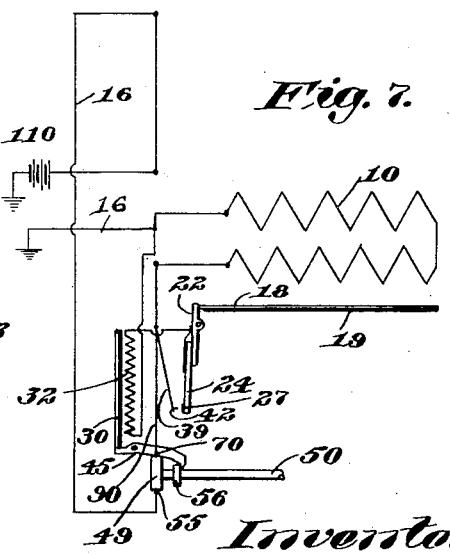
Fig. 7 is a circuit diagram of the invention.

In Fig. 7, which is a diagram of the circuits utilized in my invention and controlled thereby, it is assumed that the conductors 16 are attached to any suitable source of power, as the battery 110. When the devices illustrated are in the normal operating position, as shown in Fig. 2, the disc 49 will be in engagement with the contact plates 55 and 70, and a circuit may be traced from the battery 110, through one of the conductors 16 to the plate 55, disc 49, plate 70, plate 90, to the heating element 10 of the device and back to battery through the other conductor 16. The degree of heat desired before operation of the cut out device is assumed to have been regulated by operating the dial 80. As the iron heats up, the tube 18 will expand moving the projecting end of the rod 19 inwardly, or to the right, as viewed in Fig. 2, when the contact 27 will move gradually toward the contact 42. When the desired degree of heat of the iron has been reached, contact 27 engages with contact 42, closing a circuit from battery 110, through contact plate 90, arm 39, contacts 27 and 42, arm 24, arm 22, through resistance element 32, to conductor 16 to ground and back to battery. Element 32, heating quickly, expands tube 30 which operates latch member 45 and releases rod 50, spring 63 moving said rod 50 to the right, as viewed in Fig. 2, and moving disc 49 from engagement with contact plates 55 and 70, and disconnecting the source of power from the heating element.

My invention is further described and defined in the form of claims as follows:

1. In a device of the class described, the combination of a source of power, a heating element adapted to be connected thereto, a switch manually operated to connect the heating element with the source of power, a thermostat directly controlling the switch to disconnect the source of power from the heating element, and a thermostat associated with said heating element and controlling said first thermostat.

2. In a device of the class described, the combination of a source of power, a heating element adapted to be connected thereto, a switch, a thermostat associated with said heating element, a second heating element associated with said switch, a second thermostat associated therewith, a switching element interposed between the thermostats and controlled by the first thermostat to connect the source of power to the second heating element.

3. In a device of the class described, the combination of a source of power, a heating element adapted to be connected thereto, and a thermostat associated with said heating element and controlled thereby, a switch controlled by said thermostat, means for varying the throw of said switch, a second thermostat adapted to be connected to the source of power by said switch, and a switch controlled by the second thermostat to disconnect the source of power from the heating element.

4. In a device of the class described, the combination of a source of power, a heating element adapted to be connected thereto, and a plurality of thermostatic controls therefor, one of said thermostats being directly influenced by the heating element.

5. In a device of the class described, the combination of a source of power, a heating element adapted to be connected thereto, and a plurality of thermostatic controls therefor, one of said thermostats being remote from the heating element, but directly controlled thereby.

6. In a device of the class described, the combination of a source of power, a heating element, a switch, a circuit including the source of power, heating element, and switch, a thermostat located adjacent to, and associated with, and adapted to be controlled by the heating element, a switch controlled by said thermostat, a second thermostat adapted to control the first said switch, a second heating element associated with and controlling the second thermostat, and a switch associated with the first thermostat and controlling the operation of the second heating element whereby the switch in the circuit leading from the source of power is controlled by a thermostat that is in turn controlled by the main thermostat.

In testimony whereof, I have signed my name to this specification.

JOHN E. HARVEY.